(12) United States Patent
Daeschner (10) Patent No.: US 6,361,063 B1
(45) Date of Patent: *Mar. 26, 2002

(54) PORTAGE DEVICE

(76) Inventor: Douglas Lincoln Daeschner, 10491 Georgetown Dr., Rancho Cordova, CA (US) 95670

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,235

(22) Filed: Mar. 18, 1999

(51) Int. Cl.[7] ................................................. B62B 1/02
(52) U.S. Cl. .................. 280/655; 280/659; 280/43.1; 280/47.18; 280/47.3
(58) Field of Search .............................. 280/288.4, 290, 280/655, 292, 652, 304.5, 47.3, 47.18, 24, 43.16, 1.206, 1.207, 654, 1.5, 47.17, 659

(56) References Cited

U.S. PATENT DOCUMENTS

| | | | | |
|---|---|---|---|---|
| 2,992,834 A | * | 7/1961 | Tidewell et al. | 280/47.3 |
| 3,236,537 A | * | 2/1966 | Eckman | 280/47.3 |
| 3,456,959 A | * | 7/1969 | Hemphill et al. | 280/47.3 |
| 4,869,517 A | * | 9/1989 | Smith | 280/47.3 |
| 5,385,355 A | * | 1/1995 | Hoffman | 280/1.5 |
| 5,820,141 A | * | 10/1998 | Wilkerson et al. | 280/47.3 |
| 5,884,720 A | * | 3/1999 | Seto | 280/47.3 |
| 6,039,333 A | * | 3/2000 | Hamblin | 280/1.5 |

FOREIGN PATENT DOCUMENTS

GB 0255007 * 8/1926

* cited by examiner

*Primary Examiner*—Richard M. Camby
(74) *Attorney, Agent, or Firm*—Risto A. Rinne, Jr.

(57) ABSTRACT

An apparatus for the portage of a cargo includes an articulated frame assembly, one half of which supports a wheel and the remaining half of which is yoked to a control handlebar and waist belt assembly that is worn around the waist of a user. A table, saddlebags, and pouches attach to the apparatus for containing the cargo as does a bench type of a seat. The control handlebar pivots about an axis that is generally parallel with a surface. The two frame halves articulate as needed about a pivot axis disposed in a pivot assembly. The pivot axis is generally disposed in a substantially vertical orientation with respect to the surface when the user is making turns. The pivot axis assembly includes a pivot brake and it can be allowed to pivot or it can be locked in position as a rigid non-articulating frame assembly. The control handlebar pivots into a second position that places the ends in contact with the surface and is useful for the stationary storage of the apparatus. The user may sit on the seat and use the table in this position. A variety of accessory items are anticipated for use and subsequent attachment to the apparatus in order to satisfy particular adaptation requirements.

26 Claims, 5 Drawing Sheets

PORTAGE DEVICE

BACKGROUND OF THE INVENTION

1. Field of the Invention

The present invention, in general relates to wheeled portage devices and, more particularly, to a portage device having a single wheel that is attached to the waist of a user.

The need to portage supplies and equipment is well known. No one device is suited for all applications. As an example, self-propelled portage devices include motor vehicles of all types. Accordingly, a large dump truck is suited for the portage of certain items, such as gravel, whereas a motorcycle is better suited for the transport of its rider and a very limited cargo.

However, there are situations that call for the portage of items that do not permit the use of a motor powered self-propelled vehicle. For example, the use of motor vehicles is prohibited in certain wilderness back-country areas. Backpackers who wish to visit and perhaps camp in these areas have before been required to transport the necessary items on a backpack. This has limited the amount of cargo to a weight that they can easily transport.

Those hikers with back-related problems are in many instances prohibited from access to such remote areas to the extent that they are unable to carry items on their backs. Even healthy individuals are limited as to the weight that can be carried in a backpack.

This is due both to human carrying capacity and also to reasons of physics as they relate to considerations regarding stability. Ideally, a heavy item should be disposed as close to the surface (ground) as is possible for maximum stability. Backpackers who know this put heavier items in the bottom of their packs and lighter items at the top.

Heavy items disposed high on the human frame make the person top heavy and prone to falling, especially if he or she should lean forward or backwards too far. As it is, backpackers must compensate for the weight that is in their backpacks by leaning forward an increased amount. This puts their torsos into an attitude that is unfamiliar and, because it tilts the head forward, uncomfortable at best. It may also compromise safety in that forward (and overhead) visibility is further restricted as a result of the increased forward lean angle.

There is a need for those hiking trails and wilderness areas to be able to transport heavier, and also bulkier, cargo items than can readily be transported in a backpack. There is also a need to be able to more easily and with greater comfort transport items that could otherwise be carried in a backpack. There is a further need to improve access to these types of remote areas to individuals who, for whatever reason of infirmity, would be disadvantaged to use a backpack or any of the known means of transporting items into wilderness areas.

Also, the need to transport heavier, bulkier, or simply more items easier and safer is not limited solely to those who backpack. Many situations could benefit from such a device, too innumerable to recite all but a few here. Postal mail carriers in particular, who walk door to door delivering the mail, stand to benefit both in terms of carrying capacity and also in terms of safety and efficiency if they are able to carry heavier loads in an easier manner.

Street vendors have similar needs. Those who peddle foodstuff, such as hot dogs and pretzels would welcome such a device as would those who sell trinkets and other miscellaneous items. Vendors who work in shopping malls or at fairs and shows also have similar needs.

And, aside from the need to transport cargo items, there is also a need to provide a resting place for the user, such as a chair. Some innovative types of folding chairs have been created for this purpose, but they must either be carried separately or they add significantly to the complexity of the device itself.

Accordingly there exists today a need for a wheeled portage device that permits placing cargo items close to the surface of the ground and which facilitates their transport under a variety of situations.

Clearly, such an apparatus would be a useful and desirable device.

2. Description of Prior Art

Wheeled portage device are, in general, known. For example, motor powered devices such as motorcycles, automobiles, and trucks are known. Operator powered devices such as bicycles, carts, and wheelbarrows are known.

While the structural arrangements of the above named devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an improved portage device that is easy to use.

It is also an important object of the invention to provide an improved portage device that can be used to transport a cargo.

Another object of the invention is to provide an improved portage device that is powered by a human.

Still another object of the invention is to provide an improved portage device that includes one wheel, a frame assembly, and is attached to the waist of a user and is pulled by him when he or she is walking or hiking.

Still yet another object of the invention is to provide an improved portage device that includes an articulated frame.

Yet another important object of the invention is to provide an improved portage device that is versatile.

Still yet another important object of the invention is to provide an improved portage device that is adaptable to provide a seat to sit on and a table.

Briefly, an improved portage device that is constructed in accordance with the principles of the present invention has a single wheel and surrounding frame assembly to which a cargo may be attached. The frame assembly includes a waist belt assembly that is adapted for securing the frame about the waist of a user for portage wherein the frame and wheel are generally disposed behind the user. Intermediate the waist belt assembly and the wheel a pivot about an axis is provided that divides the frame assembly into two halves, each of the two halves being disposed on opposite sides of the axis. The axis is disposed in a more vertical than horizontal orientation. The pivot can be regulated by the user to allow the frame assembly halves to articulate about the axis to provide improved maneuvering around corners or to maintain rigidity for improved travel over straight areas or uneven surfaces and when parking the device. A variety of load carrying devices, such as saddlebags, flat surfaces, and pouches, each of which is designed to best satisfy the requirements for a particular use, are attached to either of the frame assembly halves. Other accessory devices, such as a tent fly, are also attached to the frame assembly and are intended to improve the versatility of the portage device when it is parked.

DETAILED DESCRIPTION OF THE INVENTION

Figure 1:
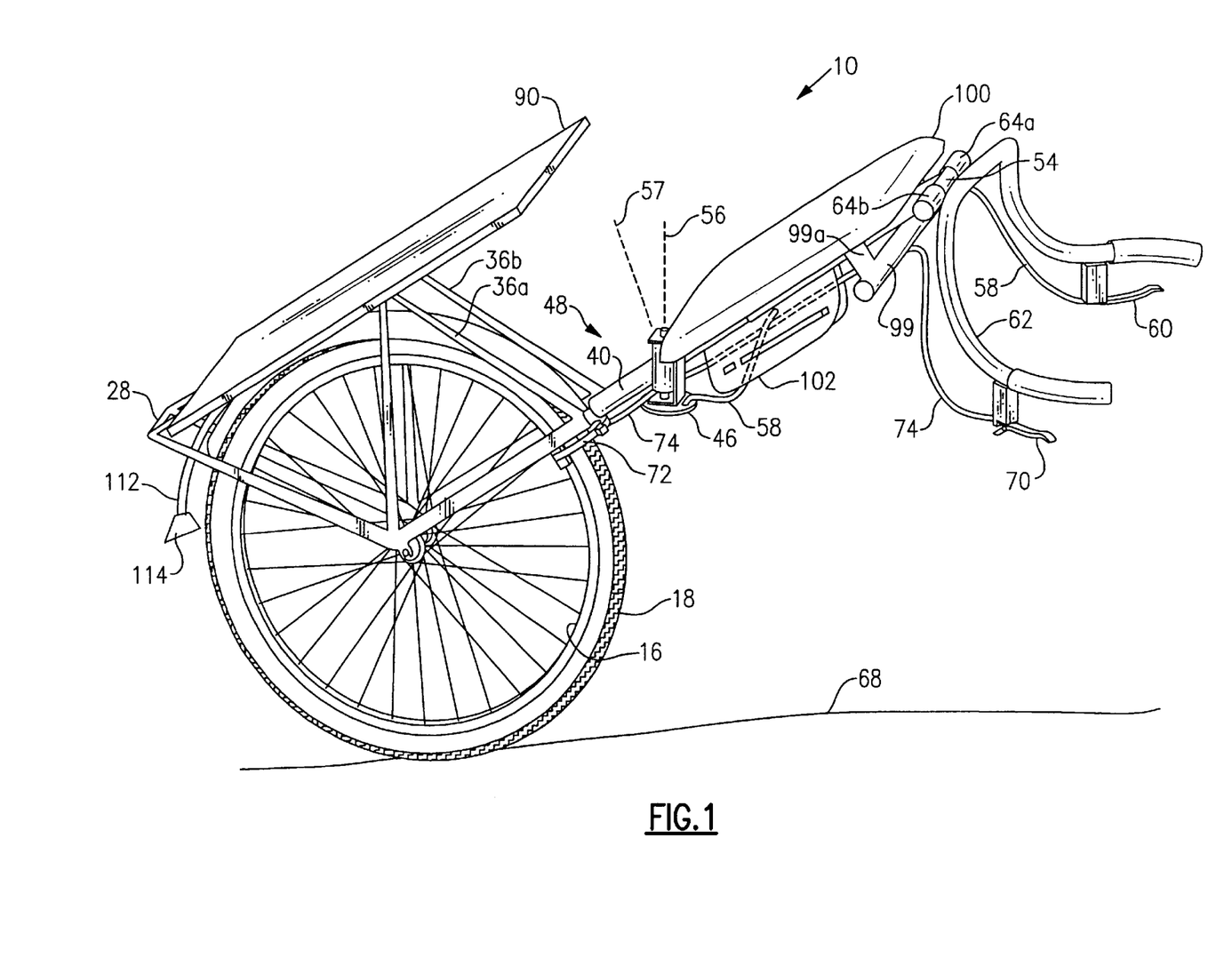
FIG. 1 is a view in perspective of an improved portage device showing two halves of a frame assembly, a wheel assembly, and portions of a waist belt assembly.

Referring now to FIG. 1 and on occasion to all of the FIGURE drawings is shown, an improved portage device, identified in general by the reference numeral 10.

Figure 2:
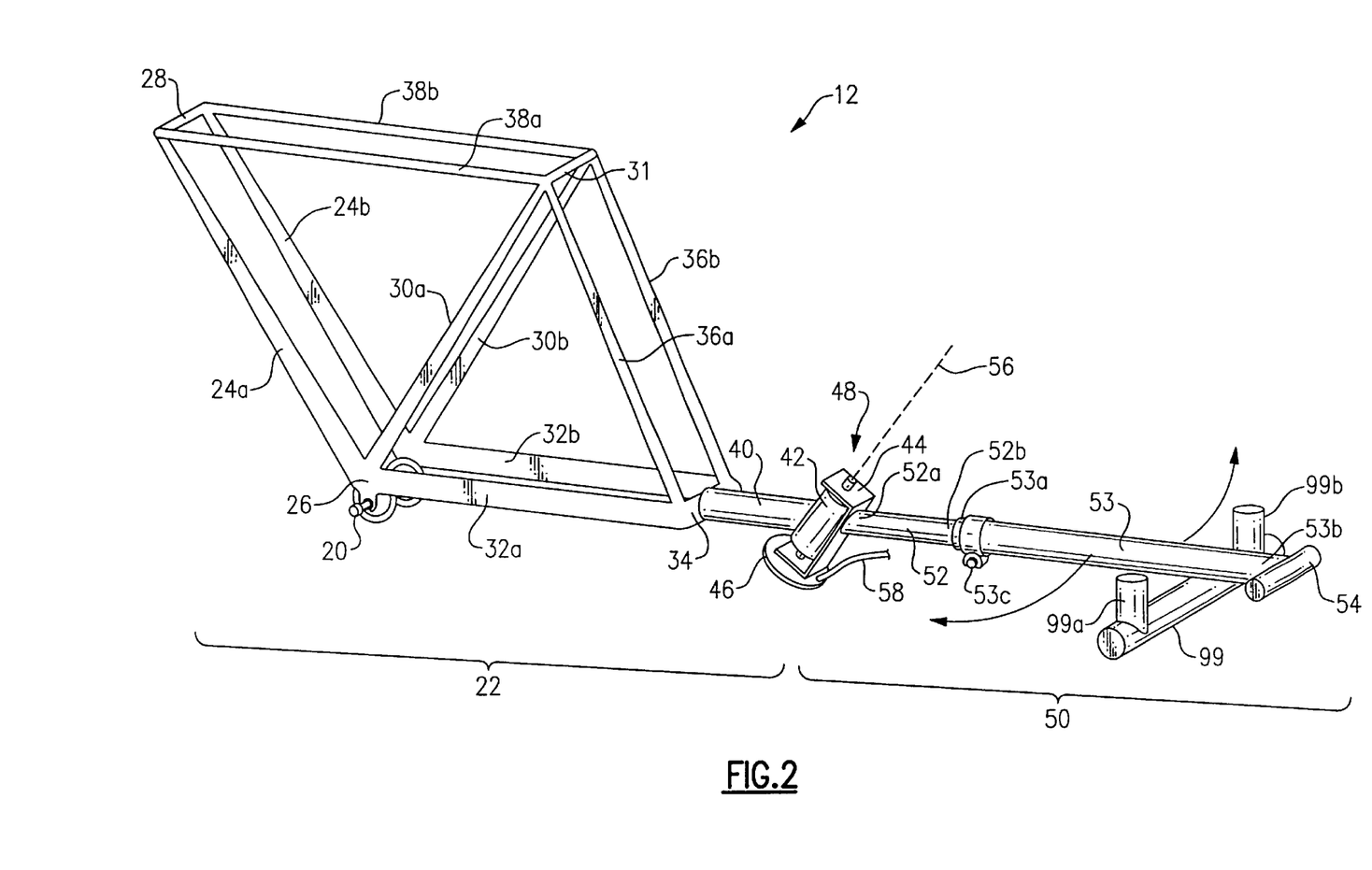
FIG. 2 is a view in perspective of the basic frame assembly.
Figure 3:
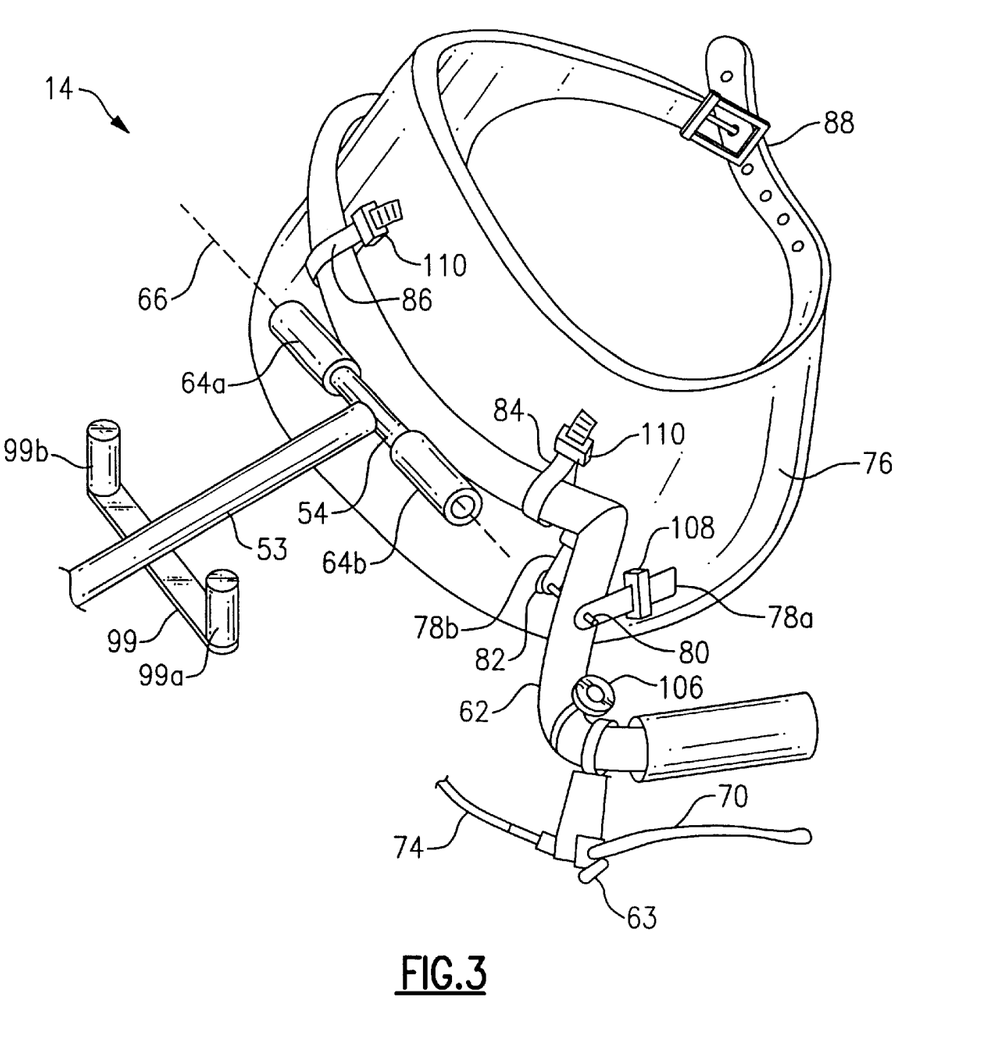
FIG. 3 is a view in perspective of the waist belt assembly.

The portage device 10 consists of two primary assemblies, a frame assembly, identified in general by the reference numeral 12 in FIG. 2, and a waist-belt assembly, identified in general by the reference numeral 14 in FIG. 3.

Various component parts of the portage device 10 are described hereinafter as being "attached" to other component parts. The method that is used to attach one part to another is a variable that is influenced by many factors, including conventional practice, cost, ease of assembly and disassembly, and maintenance. When appropriate, fasteners such as screws, nuts and bolts, threaded fasteners, and the like are relied upon to attach one part to another. When appropriate component parts are welded to each other. When appropriate, certain parts may be detachably attachable, such as by the use of a hook and loop type of fastener marketed under the tradename, "VELCRO". Accordingly, the words "attach", "attachable", and "attached" are intended to include any of the above as well as other known methods.

A wheel 16 and a tire 18 are attached to the frame assembly 12 and adapted to rotate about an axle 20. The frame assembly 12 supports the wheel 16 and the tire 18 and provides a support platform that is adapted for the attachment of a variety of load carrying devices, depending upon the particular use intended for the portage device 10.

The load carrying devices are designed for the specific application in mind and are discussed in greater detail hereinafter. For example, the needs of a street vendor will differ from those of a mail delivery person, and both will differ from those of a wilderness camper. Other applications also have their specific requirements for carrying cargo items. These needs are satisfied by the design of specific load carrying devices that are in turn attached to the frame assembly 12.

A first half 22 (FIG. 2) of the frame assembly 12 includes a pair of rear members 24a, 24b, a first end of each being attached to an axle support 26 on each side of the axle 20. The rear members 24a, 24b generally extent toward the rear of portage device with a second end of each generally being disposed further behind and above the axle 20 than are the first ends.

Intermediate the second end of the rear members 24a, 24b is a carrying handle 28. The carrying handle 28 is useful for picking up the rear of the portage device 10 and for lifting the wheel 16 and tire 18 over obstacles, such as logs, rocks, and water (not shown).

A first end of each of a pair of front members 30a, 30b are also attached to the axle support 26 on each side of the axle 20 and generally extend toward to front of the portage device 10 so that a second end of each is disposed higher and more forward of the axle 20 than the first end. Intermediate the second end of each of the front members 30a, 30b an upper cross member 31 is attached.

A first end of each of a pair of lower frame members 32a, 32b are similarly attached to the axle support 26 and extend generally toward the front of the portage device 10 maintaining the second end of each at an elevation proximate that of the axle 20. In use, the attitude of the frame assembly 12 is changed, as is discussed in greater detail hereinafter, and so the second end of each of the lower frame members 32a, 32b are raised somewhat more than is shown in the FIG. 2 drawing.

Intermediate the second ends of the lower frame members 32a, 32b a lower cross member 34 is attached. Intermediate the second ends of the front members 30a, 30b and the second ends of the lower frame members 32a, 32b, a pair of forward members 36a, 36b are attached.

Intermediate the second ends of the front members 30a, 30b and the second ends of the rear members 24a, 24b, a pair of upper members 38a, 38b are attached.

A front tube 40 is generally attached at a first end to the lower cross member 34 and extends therefrom at a perpendicular angle to a first half of a frame pivot 42 where it attached. The first half of a frame pivot 42 cooperates with a second half of a frame pivot 44 and a pivot brake 46 to form in general a frame pivot assembly, identified in general by the reference numeral 48.

Together, the axle support 26 disposed on both sides of the axle 20, along with the rear members 24a, 24b, the front members 30a, 30b, the lower frame members 32a, 32b, the forward members 36a, 36b, the upper members 38a, 38b, the carrying handle 28, the upper cross member 31, and the lower cross member 34, the front tube 40, and the first half of the frame pivot 42 form the first half 22 of the frame assembly 12.

A second half 50 of the frame assembly 12 includes the second half of a frame pivot 44 attached thereto. A first main member 52 is attached to the second half of the frame pivot 44 at a first main member first end 52a. The first main member 52 extends, generally, in a forward direction generally away from the first half 22 of the frame assembly 12.

The first main member 52 includes a first main member second end 52b that is distally disposed with respect to the first main member first end 52a.

A second main member 53 includes a second main member first end 53a and a second main member second end 53b that is also distally disposed with respect thereto.

Both the first main member 52 and the second main member 53 are substantially longitudinal members and are preferably tubular in construction.

The first main member second end 52b includes outside dimensions that are less than the inside dimensions of the second main member first end 53a. If the first and second main members 52 and 53 are tubular, then the outside diameter of the first main member second end 52b is less than the inside diameter of the second main member first end 53a.

This permits the first main member second end 52b to enter into the second main member first end 53a and to telescope in and out thereof. A clamp 53c is attached to the second main member first end 53a and it may be tightened to secure the first main member second end 52b in position with respect to the second main member first end 53a. The clamp 53c may be loosened to permit the first main member 52 to extend further away from the second main member 53 or conversely, to enter further into the second main member 53, as desired. Once the ideal position is established, the clamp 53c is tightened to maintain it.

The purpose is to provide a method to vary the combined lengths of the first and second main members 52, 53. Those who use the portage device 10 will be of various heights. As is described in greater detail hereinafter, when the waist belt assembly 14 (FIG. 3) is attached to the user, adjustment of the combined length of the first and second main members 52, 53 maintains the first half 22 of the frame assembly 12 at the same preferred distance behind the user and it keeps the first and second main members 52, 53 at the same preferred angle of inclination during portage of the portage device 10.

The manner by which the first main member 52 is adapted to telescope in and out of the second main member 53 and is clamped in position is similar to that as is found on conventional bicycles (not shown) in the well known way by which the height of the seat is adjusted. On conventional bicycles, the post to which the seat is attached telescopes in and out of a seat post that is attached to a bicycle frame. The position of the post is maintained by clamping a portion of the seat post tightly around the post that suspends the seat.

A cross tube 54 is attached at the second end of the second main member 53 so as to be substantially perpendicular with respect thereto.

The pivot brake 46 is designed to either permit or prevent rotation of the first half of the frame pivot 42 about a pivot axis, indicated by dashed line 56, with respect to the second half of the frame pivot 44. Because the first half of the frame pivot 42 is attached to the first half 22 of the frame assembly 12 and the second half of the frame pivot 44 is attached to the second half 50 of the frame assembly 12, both halves 22, 50 articulate (with respect to each other) about the pivot axis 56.

The motion that the brake pivot 46 is intended to regulate is relative between the first half of the frame pivot 42 and the second half of the frame pivot 44. Accordingly, the pivot brake 46 itself may either be attached to the first half of the frame pivot 42 or it may be attached to the second half of the frame pivot 44.

A pivot brake cable 58 connects to a pivot brake control 60 that is disposed on a control handlebar 62. The control handlebar 62 are somewhat like the handlebars of a bicycle (not shown), however they are designed to have a size and shape that allows for their positioning around the waist of a user (not shown).

The pivot brake control 60 is a lever similar to or identical with that used on bicycles providing that it also includes a device to maintain it in the locked or full-on position without requiring the user to maintain constant hand pressure against the pivot brake control 60. Such devices are known in the bicycling arts and they include the use of a pivot brake locking lever (not shown), however in FIG. 3 an identical type of a device is shown as a part of a rear brake control 70 and it is referred to as a rear brake locking lever 63. The rear brake locking lever 63 is identical to the pivot brake locking lever and it is described in greater detail hereinafter.

The reason for including the pivot brake locking lever is that there are times when it is desirable to prevent any rotation of the first half of the frame pivot 42 with respect to second half of the frame pivot 44 from occurring. One such time is when the portage device 10 is being used over straight smooth stretches.

To use the pivot brake locking lever, the pivot brake control 60 is squeezed by the user to fully apply (or lock) the pivot brake 46. The pivot brake locking lever is then rotated so as to maintain the pivot brake control 60 in the fully applied position as is described in greater detail hereinbelow. No further hand pressure is required. As shown, the pivot brake control 60 is operated by the left hand of the user.

If the frame assembly 12 can be locked into a rigid assembly, there is no tendency for the wheel 16 to oscillate from side to side. This, in turn, helps to make the portage device 10 feel stronger and more stable during use. When the portage device 10 is parked, it is also desirable to be able to lock the frame assembly 12, thereby improving stationary use of the portage device 10 by making it more stable.

The pivot brake 46 mechanism has a "free" position and an "applied" or locked position. In the free position the first half of the frame pivot 42 is able to freely pivot with respect to the second half of the frame pivot 44 about the pivot axis 56. In the free position, the frame assembly 12 is able to articulate about the pivot axis 56.

In the applied or locked position, the first half of the frame pivot 42 is held in its relative position with respect to the second half of the frame pivot 44. Usually, the first half 22 of the frame assembly 12 is aligned with the second half 50 of the frame assembly 12 so as to form a straight line, however if it is desired, the pivot brake 46 may be applied (locked) with the first half 22 of the frame assembly 12 forming some angle with respect to the second half 50 of the frame assembly 12.

If the portage device 10 is stationary and resting on an incline, the ability to secure the two frame assembly halves 22, 50 at some angle with respect to each other is useful in increasing the stability of the device 10.

If the user anticipates alternating between having the pivot brake 48 locked and free, the pivot locking lever is not used to maintain the pivot brake control 60 in the fully applied position, but rather the pivot brake control 60 is squeezed by the user as desired to lock the pivot brake 48 and it is released by the user when articulation between the two frame halves 22, 50 is desired.

The actual design of the pivot brake 46 mechanism must provide, minimally, a locked position and a free position. If desired, an intermediate position where some resistance to pivoting about the axis 56 is useful to stabilize the portage device 10 over certain irregular types of terrain. As such, various braking designs are candidates for the pivot brake 46.

For example, a caliper brake 72 (FIG. 1, the use of which is discussed hereinafter) such as is well known in the bicycling arts can be used to form the pivot brake 46 mechanism as well. A modified coaster brake assembly, also well known in the bicycling arts, has proven itself to be effective for use as the pivot brake 46 because it provides a more rigid locking between the frame halves 22, 50 that would the caliper brake 72 which would still permit a noticeable amount of slack or hysteresis to occur.

The actuation of the coaster brake assembly is determined by the pressure that is applied to the pivot brake control 60 which is transmitted to the pivot brake 46 through the pivot brake cable 58, thereby moving the coaster brake (or any other type of brake) from the free position progressively toward the locked position.

There is significant benefit in both stability and in maneuverability that is provided by the above described configuration. When the pivot brake 46 is in the free position, the portage device 10 permits turning about a much tighter radius.

The use of the portage device 10 is described in greater detail hereinafter, however, in general it is attached to the waist of the user at an end opposite where the wheel 16 is disposed and is pulled by the user. When the user wishes to turn, and especially when the user wishes to accomplish a tight radius turn, the pivot brake 46 is left in the free position and the first half 22 of the frame assembly 12 is allowed to pivot about the axis 56 with respect to the second half 50 of the frame assembly 12.

The first half 22 of the frame assembly 12 will lag behind the second half 50 of the frame assembly 12 as the user turns and continues to move forward thereby forming an angle intermediate the two frame assembly halves 22, 50.

The ability for the two frame assembly halves 22, 50 to articulate greatly reduces the resistance that is encountered by the user in negotiating a tight radius turn.

Otherwise, with a rigid non-articulating type of a frame (not shown), whenever the user turns, a force is exerted on the wheel 16 urging it to stay in linear alignment directly behind the user. For it to do so, it would have to literally skid over the surface of the ground whenever the user turned sharply. This, in turn, would be experienced by the user as a force that is uncomfortably applied to his or her waist whenever he or she tried to change direction.

Consequently, the present design provides comfort even when the user is making a tight radius turn. This is useful in wilderness hiking when trails change direction abruptly. Such changes are known as "switchbacks". Also, street vendors must routinely make right angle turns on sidewalks. Mail delivery personnel must also make frequent tight radius turns and are sometimes required to reverse direction.

A first half of a yoke 64a and a second half of a yoke 64b are attached to the center of the control handlebar 62 and are disposed around both ends of the cross tube 54 so as to allow pivoting of the control handlebar 62 around an upper axis 66 that passes through a longitudinal centerline of the cross tube 54.

It is important that the control handlebar 62 be able to pivot about the cross tube 54 to permit maximum comfort when using the portage device 10 and also to allow moving the control handlebar 62 from a first position (as shown in FIG. 1 and FIG. 3) that is adapted for portage and into a second position that is adapted for the stationary use of the portage device 10.

FIG. 1 shows the portage device, absent certain component parts of the waist belt assembly 14, in an attitude close to that experienced when it is being pulled by the user. It is noted that the pivot axis 56 is disposed nearly vertical with respect to a surface 68 of the ground. If the pivot axis 56 is vertical and the pivot brake 46 is in the "free" position, the first half 22 of the frame assembly 12 can articulate back and forth as well as stay in line with maximum ease.

This attitude is preferred for certain applications of the portage device where frequent turns are anticipated. However, there a slight tendency, as mentioned hereinbefore, for the wheel 16 and the supporting first half 22 of the frame assembly 12 to oscillate back and forth that can develop under certain conditions if the pivot brake 46 is left in the unlocked (free) position. This oscillation, if it occurs, is perceived as a "wobble" by the user. If the pivot brake 46 is applied, then the tendency to wobble is either eliminated or it is greatly reduced.

Another way to affect the tendency to wobble is achieved by changing the angle given to pivot axis 56.

The pivot axis 56 can be designed so as to include either a forward or a rearward tilt during normal use or it may be vertical. These angles refer to the angle that is exhibited by the pivot axis 56 with respect to the surface 68 when the portage device 10 is affixed about the waist of the user and is properly adjusted for portage.

The angle of the pivot axis 56 with respect to the surface 68 is a design variable that is determined by the primary intended use which is anticipated for the portage device 10. A number of factors, including the angle of incline that the portage device 10 is expected to be used on and the features of the surface 68 help determine the angle of the pivot axis 56.

If the pivot axis 56 is designed so as to include a slight forward tilt with respect to the surface 68, a tendency to wobble when the surface 68 is level may be reduced. This is because a slight forward inclination of the pivot axis 56 sets up the mechanical geometry so that frame pivot assembly 48 is disposed at its lowest position when the wheel 16 (and the first half 22 of the frame assembly 12) is disposed directly behind the second half 50 of the frame assembly 12.

Therefore, as the wheel 16 moves away from this alignment when turning, the frame pivot assembly 48 rises slightly. As such, the natural tendency is to seek the lowest position thereby helping to maintain the wheel 16 centered. This attitude for the pivot axis 56 may be used if preferred and when the portage device 10 is used predominantly on straight stretches as mentioned hereinabove.

However, if the portage device 10 is going to be used going down steep inclines and especially when going down steps, a forward tilt angle of the pivot axis 56 may be detrimental. In particular if the pivot axis 56 included a substantial forward tilt and if it was free to rotate, when going down such steps, there is a tendency for the first half 22 of the frame assembly 12 to pivot about the pivot axis 56 and basically to lay on its side. Under such conditions a slight rearward angle of the pivot axis 56 is anticipated and is shown by a dashed line as a modified pivot axis 57 (FIG. 1).

Of course, when the pivot brake 48 is in the applied or locked position, the position of the wheel 16 and the first half 22 of the frame assembly 12 as compared to that of the second half 50 of the frame assembly 12 is maintained.

The caliper brake 72 is attached where desired to the first half 22 of the frame assembly so that, when actuated, it bears upon the wheel 16 thereby applying a braking force to the portage device 10. The rear brake control 70 as shown is disposed on the right hand side of the control handlebar 62 and it is squeezed as desired to apply braking to the caliper brake 72 through a brake cable 74.

By first squeezing the rear brake control 70 sufficiently to fully engage the caliper brake 72 and then twisting the rear brake locking lever 63, the caliper brake 72 is maintained in the locked position. This position is intended to function as a parking brake that is useful in securing the portage device 10 in a stationary position. This is useful also when attaching or detaching the portage device 10 about the waist of the user, because it helps to prevent it from inadvertently moving.

Referring now primarily to FIG. 3, a waist belt 76 is attached to the control handlebar 62 by a first set of load bearing straps 78a, 78b that are attached to the control handlebar 62 and are secured to the waist belt 76, such as by stitching.

A pin 80 is included that passes through the control handlebar 62 and through an aperture in each of the first set of load bearing straps 78a, 78b which in turn are secured in position around the pin 80 by a clevis 82. Only the first set of load bearing straps 78a, 78b that are on the right side of the control handlebar 62 are visible. A second set of load bearing straps (not shown) provides identical symmetrical support on the left side of the control handlebar 62.

A set of retainer straps 84, 86 that loop around the control handlebar 62 and which are attached to the waist belt 76 help to keep the waist belt 76 in a position of cooperation with the control handlebar 62.

In use the waist belt 76 is placed around the waist of the user and a belt and buckle portion 88 are secured together snugly around the user's waist. The waist belt 76 is padded for comfort and is similar or identical in design to the types of belts that backpacks (not shown) rely upon. The advantages for the use of an identical design for the waist belt 76 and that used by backpacks is described in greater detail hereinafter.

As the user moves forward, the waist belt 76 naturally also moves forward. The waist belt 76, in turn, transfers force through the first set of load bearing straps 78a, 78b and the second set of load bearing straps as well as through the retainer straps 84, 86 to the control handlebar 62 pulling it and the rest of the portage device 10 along behind the user.

As the user and the portage device encounter variations in the surface 68 they both move up and down with respect to each other. The control handlebar 62 rotates about the upper axis 66 slightly in either direction to adapt for relative changes in attitude between the portage device 10 and the user. This helps improve comfort when the user is moving pulling the portage device 10.

The use of a great variety of load carrying devices and other accessory devices are anticipated to maximize the utility of the portage device 10. Only a few are mentioned herein to illustrate the possible versatility of the portage device 10.

A table 90 is shown in FIG. 1 and is attached to the pair of upper members 38a, 38b. The table 90 is adapted to receive a cargo item thereon. As the table 90 is disposed above the axle 20, any substantial weight that is placed there tends to make the portage device 10 top heavy and is therefore not a preferred location for heavy cargo items. Rather lighter items such as a pillow, or the like are preferably attached to the table 90.

It is also possible to attach items, such as a sleeping bag, to the table 90 if they are suspended underneath the table 90. Such items, if suspended under the table 90, must be disposed in front of the wheel 16 to ensure that they do not interfere with its ability to rotate.

Figure 4:
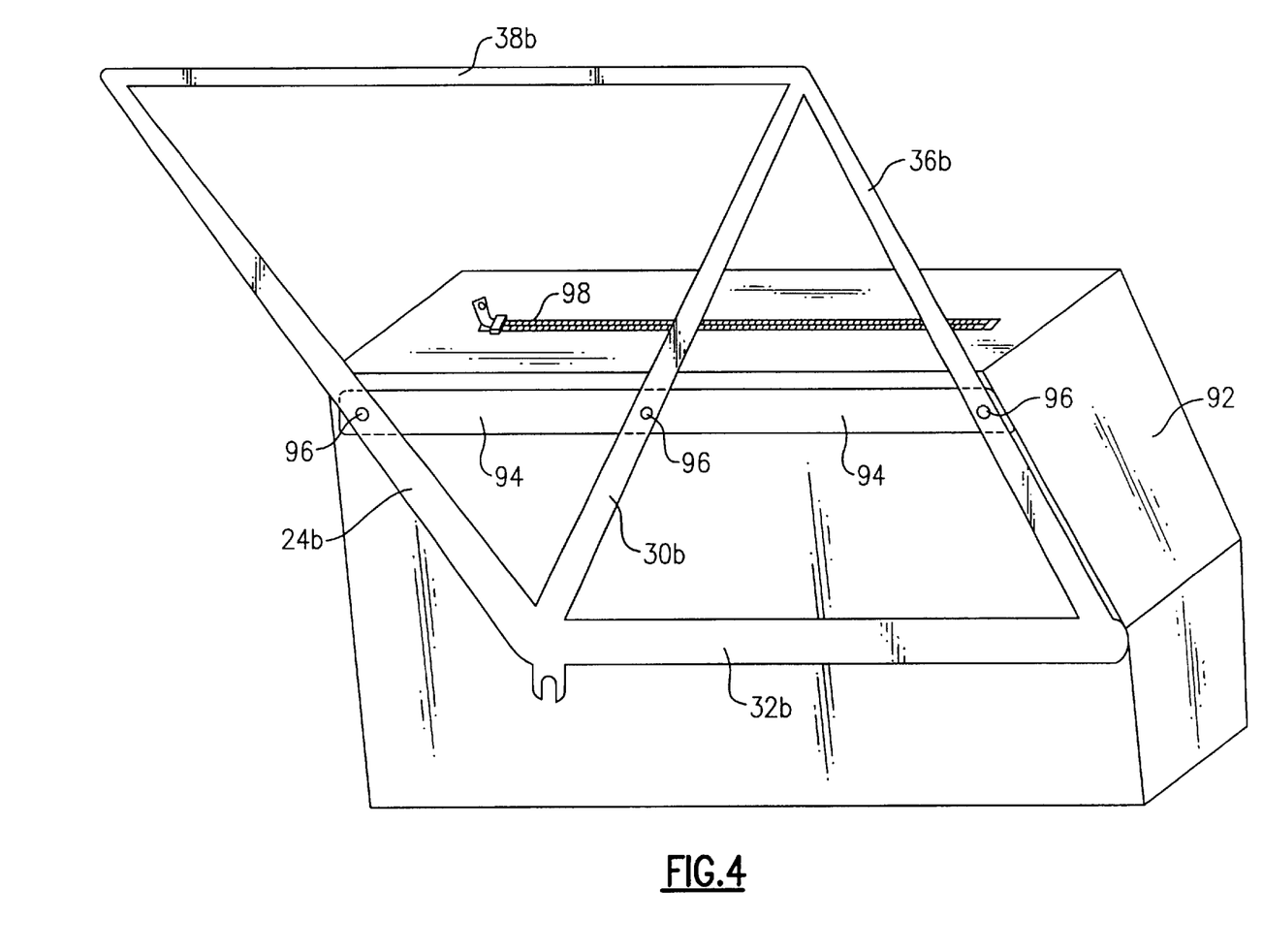
FIG. 4 is a view in perspective of a cloth saddlebag attached to a portion of the frame assembly.

Referring now primarily to FIG. 4, a cloth saddlebag 92 includes a reinforcing member 94 along one side thereof. The reinforcing member 94 is attached to the 24b and to the 30b by the use of a second set of fasteners 96. A first zipper 98 allows access into the cloth saddlebag 92. Fiberglass or plastic saddlebags may, of course, be used as desired. Cloth has certain advantages in that it is inexpensive and light in weight. However, plastic and fiberglass are more durable and can provide protection from impact to their contents.

Also, although only the one cloth saddlebag 92 is shown, it is anticipated that they will often be used in tandem disposed on both sides of the portage device 10.

Figure 5:
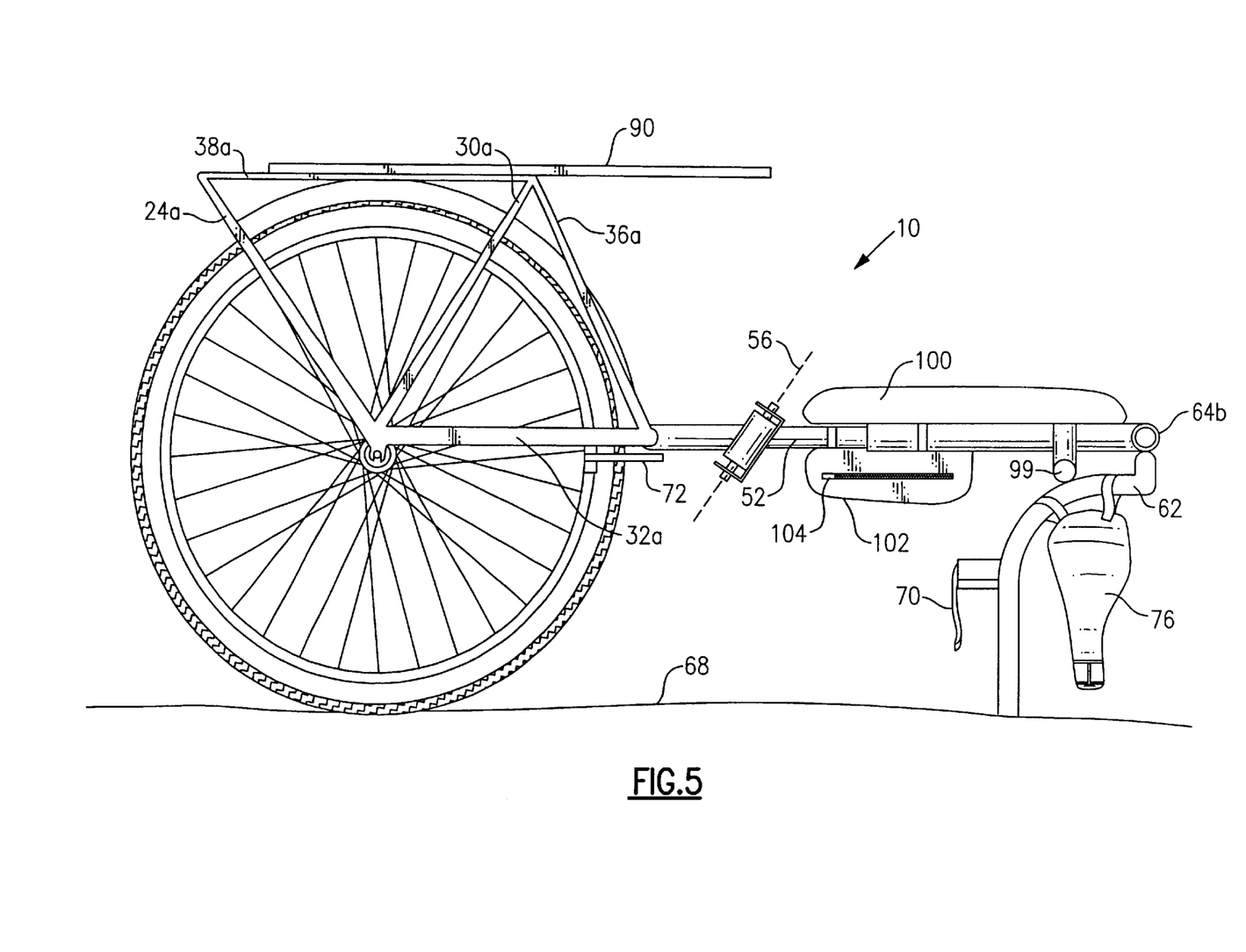
FIG. 5 is a side view of the portage device in a stationary position adapted for use as a table and bench.

Referring primarily to FIG. 5, the portage device 10 is shown disposed in a stationary position. The control handlebar 62 has been pivoted downward into a second position where each end is in contact with the surface 68 thereby providing a secure tripod mount type of self-leveling capability to the portage device 10.

A handlebar stop 99 is attached to the second main member 53 perpendicular with respect thereto so as to generally be in parallel alignment with respect to the cross tube 54. A first upright member 99a is attached at one end of the handlebar stop 99 and is perpendicular with respect thereto and extends generally in an upward direction.

A second upright member 99b is attached at the remaining end of the handlebar stop 99 and is parallel with respect to the first upright member 99a.

When the control handlebar 62 has been pivoted downward into the second position where each end is in contact with the surface 68, the handlebar stop 99 prevents it from rotating further around the upper axis 66.

A seat 100 is attached to the second main member 53 and is supported by the first and second upright members 99a, 99b so as to prevent it from rotating around a longitudinal axis of the second main member 53.

If the user wishes, he may sit upon the seat facing toward the table 90. The table 90 is useful when camping and may be used as a picnic table, for writing, or as a general utility surface. Street vendors can use the table 90 as a surface upon which to display their wares.

The seat 100 generally provides a place to sit and is itself useful whenever the user wishes to rest.

A cloth pouch 102 is attached to the second main member 53 and is suspended therefrom. A second zipper 104 allows access to the pouch 102. Objects that the user may wish to access when he is using the portage device 10 such as a jacket or water bottle are typically placed in the pouch 102.

As the weight of objects placed in the pouch 102 are transferred to the user through the waist belt 76, they are kept as light as possible. It is noted that objects on the table 90 or in the cloth saddlebag 92 transfer virtually all of their weight through the wheel 16 to the surface. Accordingly, the actual carrying weight of objects placed in these locations is not experienced by the user. This allows for the easy portage of relatively heavy cargo items without strain to the user.

When the portage device 10 is disposed as shown in FIG. 5 in a stationary position, the pivot brake control 60 and the rear brake control 70 are normally locked in the active positions to improve rigidity and to prevent movement of the wheel 16. If desired, the pivot brake control 60 can be locked with the frame halves 22, 50 at a slight angle. This is useful to level the seat 100 and the table 90 when the portage device is on a slight incline.

Many modifications to the portage device 10 are possible. For example, two or more of the portage devices (not shown) may be attached together to form a convoy as can a second user (not shown) be attached to the rear of the portage device that is in front of him. Similarly, the wheel 16 can be removed and a ski (not shown) can be used instead for portage over snow and ice. Similarly, the ski could be attached to the wheel 16 at the bottom.

Similarly, a rain fly (not shown), such as is a common device used over tents to divert the rain, is anticipated for attachment to the portage device 10. As such, the portage device 10 can be used by the wilderness hiker to transport his cargo and also to provide shelter. It is anticipated that the portage device could be adapted to provide at least a partial base for the attachment of an umbrella (not shown) or tent (not shown) directly thereto.

Other optional accessories or modifications can improve performance as well. A trip odometer 106 is useful for determining how far one has traveled. The odometer 106 is of the conventional type used with bicycles (not shown) and counts revolutions of the wheel 16 to determine distance traveled.

Also, the first set of load bearing straps 78a, 78b and the second set of load bearing straps each contain a snap connector 108 that is useful when the waist belt 76 is to be separated apart from the control handlebar 62. The set of retainer straps 84, 86 also each include an adjustable buckle 110 for detachment apart from the control handlebar 62.

It is noted that the waist belt 76 is substantially the same as that which is used on a conventional backpack (not shown), the type that a hiker would normally use. A significant advantage is realized when the portage device 10 is used in a hiking or camping application and the waist belt 76 is adaptable for use with either the backpack or with the portage device 10.

The user is able to detach the waist belt 76 apart from the backpack and then attach it to the portage device 10. The remainder of the backpack (absent the waist belt 76) is then attached where desired to the portage device 10. A likely place would be to place it on the table 90. Then, when the user wishes to hike in a more severe area, he is able to detach the waist belt 76 from the portage device 10 and use it with the backpack. The result is maximum utility accomplished at minimum weight.

As shown in FIG. 1, an optional fender 112 is attached to the first half 22 of the frame assembly 12 and extends around the wheel 16 as much as is desired. The fender 112 is useful in preventing the tire 18 from splashing rain, mud, or debris (not shown) onto the portage device 10 or onto the user.

If desired, a mud flap 114 is attached to the fender 112 or wherever it is desired on the first half 22 of the frame assembly 12.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An improved portage device, comprising:
   (a) a frame assembly adapted for supporting a wheel about an axle, said frame assembly including a first half and a second half and including means for pivoting said first half with respect to said second half about an axis said axis being disposed at a predetermined angle that is not in parallel alignment with respect to a surface upon which said device is placed when said device is adapted for attachment to a user for portage thereof; and
   (b) means for detachably attaching said frame assembly to a waist of said user wherein said frame assembly and said wheel are disposed behind said user.

2. The device of claim 1 wherein said means for pivoting includes means for limiting said pivoting.

3. The device of claim 1 wherein said means for pivoting includes brake means.

4. The device of claim 3 wherein said brake means is adapted to vary the amount of friction experienced by said means for pivoting, thereby regulating and controlling the ease of pivoting.

5. The device of claim 1 wherein said means for detachably attaching said frame assembly to a waist of said user includes a control handlebar.

6. The device of claim 5 wherein said control handlebar is pivotally attached to said frame assembly about an upper axis, said upper axis being disposed generally perpendicular with respect to a longitudinal line of said frame assembly and parallel with respect to a surface of the ground.

7. The device of claim 6 wherein said control handlebar is adapted to pivot from a first position adapted for portage of the device into a second position adapted for placement of the device on said surface of the ground.

8. The device of claim 7 wherein including means for maintaining said control handlebar in said second position.

9. The device of claim 8 wherein said means for maintaining said control handlebar in said second position includes a handlebar stop that is attached to said frame assembly.

10. The device of claim 5 including a waist belt attached to said control handlebar, wherein said waist belt is adapted for fastening around the waist of said user and for pulling said device.

11. The device of claim 1 including a carrying handle attached to said frame assembly.

12. The device of claim 1 wherein said frame assembly includes means for attaching a cargo thereto.

13. The device of claim 12 wherein said means for attaching a cargo includes a table.

14. The device of claim 12 wherein said means for attaching a cargo includes at least one saddlebag.

15. The device of claim 14 wherein said saddlebag is formed of cloth and includes a reinforcing member for attachment to said frame and a zipper for access into said saddlebag.

16. The device of claim 12 wherein said means for attaching a cargo includes a pouch.

17. The device of claim 1 including means for braking said wheel, said means for braking said wheel attached to said frame assembly.

18. The device of claim 17 wherein said means for braking includes means for securing said brake in an active position.

19. The device of claim 1 including means for providing a seat, said means for providing a seat attached to said frame assembly.

20. The device of claim 1 including a fender attached to said frame assembly.

21. The device of claim 1 including means for adjusting the length of said frame assembly.

22. The device of claim 21 wherein said means for adjusting the length includes a first main member attached to said frame assembly and a second main member attached to said frame assembly, wherein said first main member is adapted to telescope in and out of said second main member and including means for clamping said first main member in a position relative to said second main member.

23. The device of claim 1 wherein said axis includes a forward tilt.

24. The device of claim 1 wherein said axis includes a rearward tilt.

25. The device of claim 1 wherein said axis is disposed at a perpendicular angle with respect to a horizontal surface upon which said device is placed and when said device is attached to said user for portage thereof.

26. An improved portage device, comprising:
   (a) a frame assembly adapted for supporting a wheel about an axle, said frame assembly including a first half and a second half and including means for pivoting said first half with respect to said second half about an axis, said axis being disposed at a predetermined angle that is not in parallel alignment with respect to a surface upon which said device is placed when said device is adapted for attachment to a user for portage thereof and including means for braking attached to said means for pivoting, whereby said means for braking is adapted to preclude said first half from pivoting with respect to said second half when said means for braking is applied;

(b) means for detachably attaching said frame assembly to a waist of a user wherein said frame assembly and said wheel are disposed behind said user; and (c) means for attaching a cargo thereto, said means for attaching a cargo attached to said frame assembly.

\* \* \* \* \*